United States Patent [19]

Obata et al.

[11] 3,975,025

[45] Aug. 17, 1976

[54] PICKUP CARTRIDGE

[75] Inventors: Shuichi Obata, Kyoto; Akira Kagata, Neyagawa; Katsuhiko Morita, Kyoto; Masatoyo Kubo, Hirakata; Masashi Itoh, Ibaragi, all of Japan

[73] Assignee: Matsushita Electric Industrial Co., Ltd., Osaka, Japan

[22] Filed: July 20, 1973

[21] Appl. No.: 381,085

[30] Foreign Application Priority Data

July 21, 1972 Japan .......................... 47-73746

[52] U.S. Cl. .................................................. 274/37

[51] Int. Cl.[2] .................... H04R 1/16; H04R 11/08; G11B 3/02

[58] Field of Search .............. 274/37; 179/100.41 K

[56] References Cited

UNITED STATES PATENTS

| | | | |
|---|---|---|---|
| 3,218,399 | 11/1965 | De Vries | 179/100.41 K |
| 3,221,110 | 11/1965 | De Vries | 179/100.41 K |
| 3,233,047 | 2/1966 | Weathers | 179/100.41 K |
| 3,243,524 | 3/1960 | Laux | 274/37 |
| 3,482,061 | 12/1969 | Grado | 179/100.41 K |
| 3,514,550 | 5/1970 | De Vries | 179/100.41 K |
| 3,531,601 | 9/1970 | Muttick | 179/100.41 K |

FOREIGN PATENTS OR APPLICATIONS

| | | | |
|---|---|---|---|
| 1,088,242 | 9/1960 | Germany | 179/100.41 K |

*Primary Examiner*—Harry N. Haroian

*Attorney, Agent, or Firm*—Stevens, Davis, Miller & Mosher

[57] ABSTRACT

In a stereophonic pickup cartridge which derives two or more than two electric signals from a stereophonic sound recording disk of so-called 45° — 45° type, there is provided a displacement-type pickup cartridge having an improved vibration transmission structure.

29 Claims, 36 Drawing Figures

PICKUP CARTRIDGE

This invention pertains to an improvement of a pickup cartridge which functions as a transducer for the reproduction of a two-dimensional or multi-dimensional stereophonic sound recording disk, a single sound groove of which has recorded thereon two or more than two independent signals.

Especially, in a sterophonic pickup cartridge which derives two or more than two electric signals from a so-called 45° — 45° stereophonic sound recording disk in which one or more than one independent signals are engraved in each of two wall surfaces of a V-shaped groove which define a right angle with an inclination of 45° to the surface of the disk, this invention relates to an improved vibration transmission structure of a so-called displacement-type pickup which uses a pressure to electricity transducer for converting pressure variations caused by mechanical vibrations of a stylus tip to variations in an electric signal proportional to the displacement of the stylus tip.

FIG. 1*a* is a front view of the principal portion of a conventional pickup cartridge and FIG. 1*b* is a side view of the principal portion thereof.

FIG. 2*a* is a front view of the principal portion of one embodiment of the pickup cartridge of the invention and FIG. 2*a* is a cross-sectional view of FIG. 2*a* on line IIb — IIb.

FIGS. 3*a*, 3*b*, 3*c*, 3*d* and 3*e* are explanatory views of the operation of the embodiment shown in FIGS. 2*a* and 2*b*.

FIGS. 4*a* and 4*b* are general side views of another embodiment of the invention where the position of the coupler is changed.

FIG. 4*c* is a general side view of the support structure for a coupler and stylus arm.

FIGS. 5*a*, 5*b* and 5*c* are general views of modified embodiments of the invention where the relative position of the coupler with respect to the transducer is changed.

FIGS. 6*a* and 6*b*, FIGS. 7*a*, 7*b* and 7*c*, and FIGS. 8*a*, 8*b* and 8*c* are general views of modified embodiments of the invention when the shape of coupler is changed.

Figure 11A:
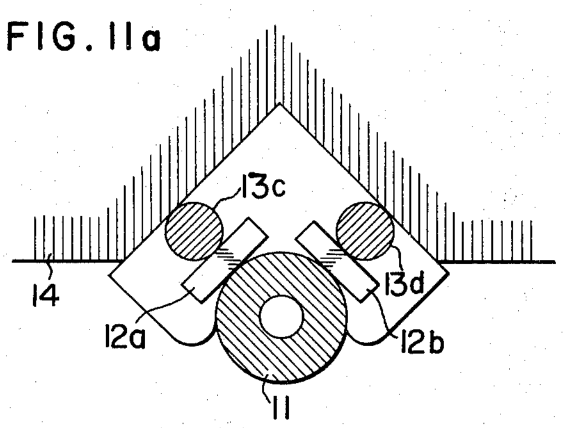
Figure 11B:
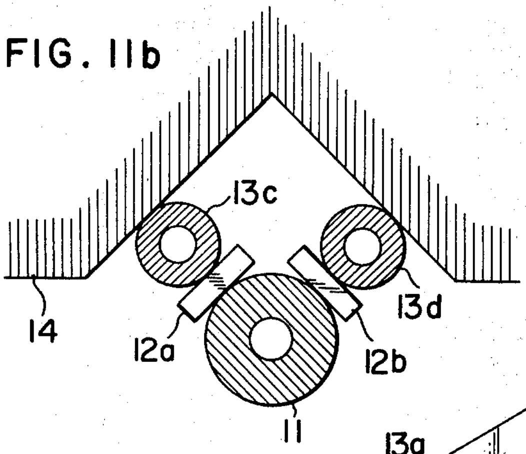

FIGS. 11*a* and 11*b* are cross-sectional views of modified embodiments of the damper.

Figure 11C:
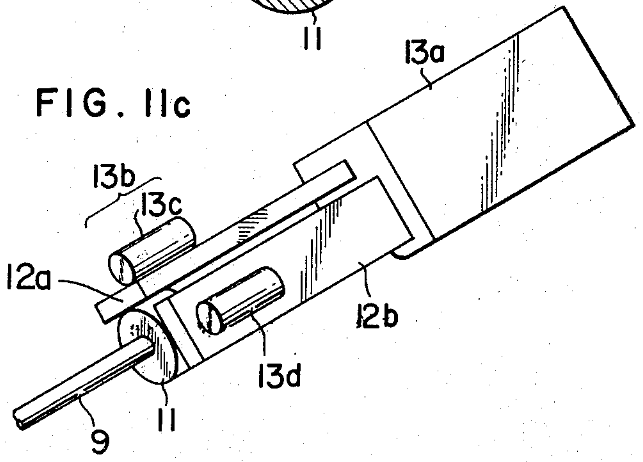

FIG. 11*c* is a perspective view of the damper shown in FIG. 11*a*.

Figure 12:
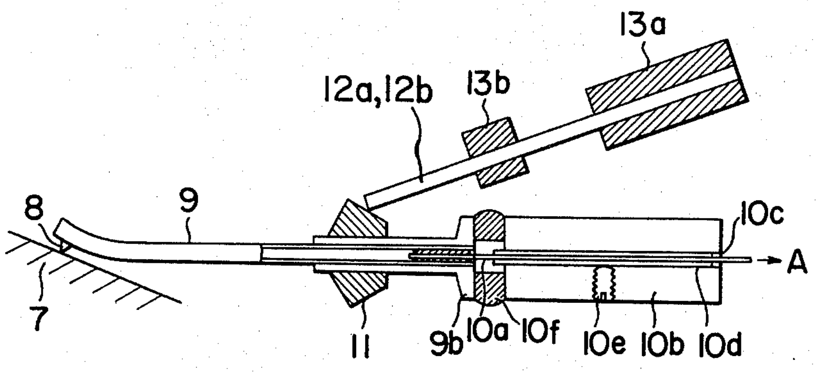

FIG. 12 is an explanatory view of another embodiment where the stylus tip is positioned at the opposite side to the transducer.

Figure 13A:
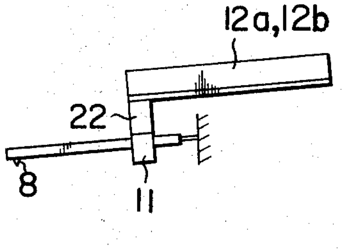
Figure 13A:
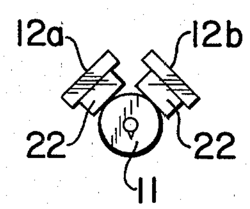

FIGS. 13*a*, 13*b*, 13*c* and 13*d* are general views of modified embodiments of FIG. 12. FIG. 13a' is an axial view of the pickup cartridge of FIG. 13*a*.

Figure 14A:
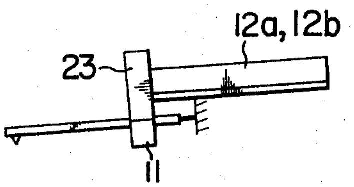
Figure 14B:
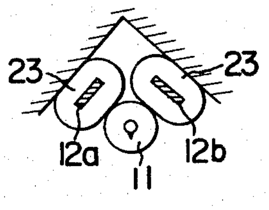

FIG. 14*a* and 14*b* are general side view and front view of further modified embodiments.

Figure 15:
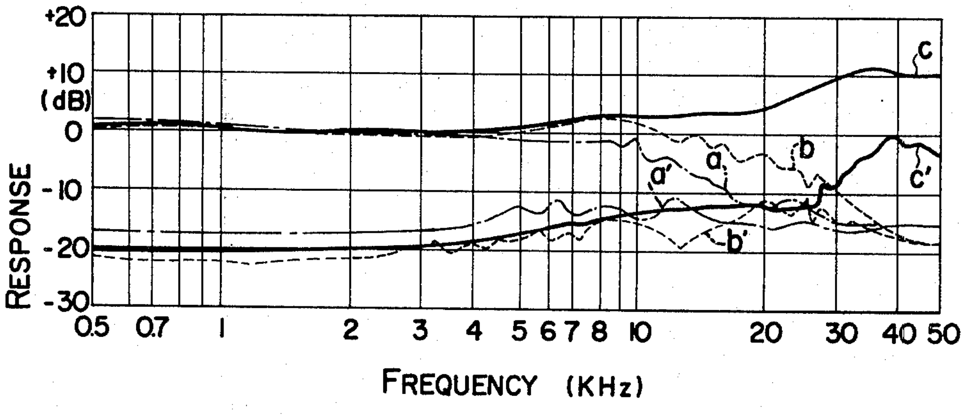

FIG. 15 is a diagram depicting frequency responses for the conventional pickup cartridge and the pickup cartridge of the invention.

In the drawings, like reference numerals refer to like parts.

Figure 1A:
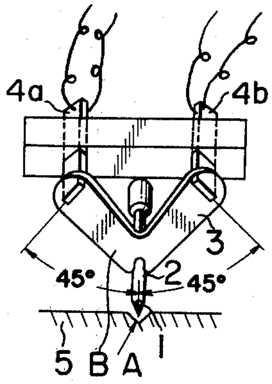
Figure 1B:
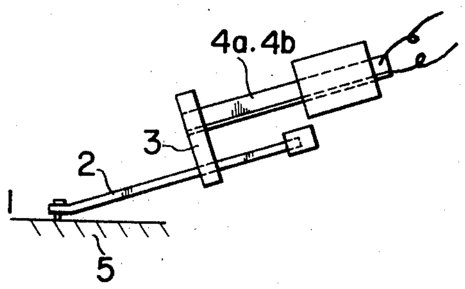

Generally, in a conventional pickup cartridge of the displacement type as shown in FIGS. 1*a* and 1*b*, mechanical vibrations picked up by a stylus tip 1 are transmitted through a substantially V-shaped viscous resilient resolver 3 engaging a stylus arm 2 to electromechanical transducers 4*a* and 4*b* consisting of piezoelectric elements, and reproduced as electric signals. The resolver 3 is made V-shaped so that each of two electromechanical transducers 4*a* and 4*b*, which define at a right angle and are disposed with inclinations of 45° to the surface of sound recording disk 5 in conformity with right and left sound groove walls of sound recording disk 5 of the 45° — 45° type, produces independent output voltages in response to the modulation direction of the sound groove and the modulation degree. For example, when modulation is in the direction of arrow A, mechanical vibrations are transmitted to the transducer 4*b* alone and not to the other transducer 4*a* owing to bending at portion B, thereby separating right and left signals. The conventional pickup cartridge of this construction has many disadvantages such that the resolver 3 is increased in size with an increase in the mass of the vibrator portion, it is difficult to reproduce high frequencies, and the arm portion of the resolver 3 increases in length with the result that the phase shift increases especially at high frequencies to considerably decrease the separability of right and left signals and thus increase cross talk. Moreover, the large-sized resolver 3 of this type, which requires a large amount of viscous resilient material, suffers from poor temperature characteristics and an increase in transmission loss at low frequencies. Especially, the conventional pickup cartridges have a disadvantage in that the ability of the pickup cartridge is insufficient to render the pickup cartride usable for the currently developed AM - FM type discrete four channel stereophonic sound recording disk which requires a reproduction frequency band ranging from 30 Hz to 45 kHz and excellent separation and phase characteristics for high frequencies.

Accordingly, it is the principal object of this inventon to eliminate such disadvantages. More particularly:

1. An object of this invention is to provide a wide band pickup cartridge capable of responding to frequencies ranging from audio frequency to 50 kHz which has high output sensitivity.

2. Another object of this invention is to provide a pickup cartridge free from cross talk by incorporating a novel stylus to transducer coupler capable of clearly separating right and left channels especially at high frequencies.

3. Another object of this invention is to provide an improved cartridge in which divisional vibrations of the stylus to transducer coupler are small at high frequencies and the phase shift is small.

4. Another object of this invention is to provide an improved high sensitivity cartridge of low attenuation of response at intermediate and low frequencies by decreasing the vibration transmission loss at intermediate and low frequencies.

5. Yet another object of this invention is to provide an improved cartridge having favorable temperature characteristics by utilizing a compact coupler.

6. Yet another object of this invention is to provide a stable and high efficiency cartridge capable of reproducing the aforementioned discrete four channel stereophonic sound recording disk owing to the foregoing various improved characteristics.

7. Yet another object of this invention is to provide a stylus exchangeable cartridge in which an easy and steady mounting and dismounting of the stylus is achieved by means of a stylus to transducer coupling structure capable of providing stable coupling which is simple in structure and has high ability.

8. Yet another object of this invention is to provide an improved cartridge wherein working stylus pressure, stylus tip compliance and frequency response can be determined as desired.

This invention brings forth the following advantages.

1. Since the stylus tip of extremely small mass permits high resonance frequencies beyond the audio frequency range and facilitates a frequency response between 20 Hz and 50 kHz, a wide band pickup cartridge suitable for the discrete four channel stereophonic sound recording disk is obtained.

2. A novel principle of channel separation on the basis of "sliding" which substitutes for the conventional channel separation mechanism on the basis of "bending" of a V-shaped resolver offers sufficient separation characteristics and decreases cross talk especially at high frequencies.

3. Decrease in divisional vibrations of the coupler at high frequencies decreases phase shift, whereby not only phase characteristics are improved, but also vibration transmission loss at intermediate and low frequencies is reduced to increase output sensitivity.

4. Since the compact coupler ensures the optimum vertical tracking angle of the cartridge, it is possible to fabricate a cartridge free from vertical tracking error and distortion.

5. Desired determinations of stylus pressure, output sensitivity and frequency response can be obtained by changing the position of the coupler on the stylus arm.

6. Easy exchange of stylus and steady coupling thereof to transducer avoid variation in characteristics due to the exchange of stylus.

A pickup cartridge of the invention will be described in conjunction with the accompanying drawings depicting preferred embodiments.

Figure 2A:
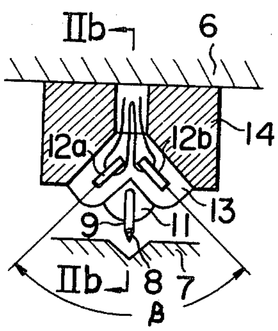
Figure 2B:
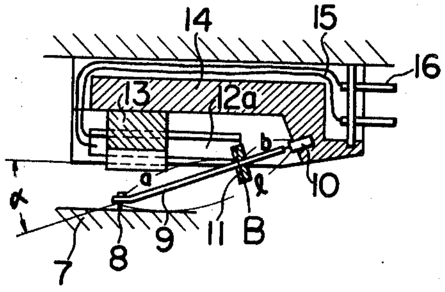

FIGS. 2*a* and 2*b* show the construction of one embodiment of the invention, FIG. 2*a* being a front view and FIG. 2*b* a cross-sectional view, taken along IIb — IIb, of FIG. 2*a*.

With reference to FIGS. 2*a* and 2*b*, a stylus arm 9 has one end carrying a stylus tip 8 and the other end pivotally mounted to a stylus arm support structure 10. A stylus to transducer coupler 11 (hereinafter called a coupler) made of viscous resilient material, for example butyl rubber and plastics, is mounted to the stylus arm 9 at its central portion in the longitudinal direction. Vibration pressure responsive to a sound groove of a sound recording disk 7 is picked up by the stylus tip 8 and transmitted to one end of each of pressure to electricity transducers **12*a* and 12*b* (hereinafter called transducer) through the coupler 11.**

The transucers **12*a* and 12*b* are piezoelectric ceramic elements which exhibit the piezoelectric effect. They are each made of piezoelectric material shaped as a strip with a longitudinal axis and a rectangular cross section normal to the longitudinal axis. One end portion of the transducer is held by a damper 13 of viscous resilient material, for example butyl rubber, secured to a case 14. The mechanical vibrations transmitted through the coupler 11 to the transducers 12*a* and 12*b* are converted into electric signals which in turn are delivered to output terminals 16** by means of lead wires.

For the transducers **12*a* and 12*b*,** as disclosed in Japanese Patent Publication No. 5930/1968, it is advisable to use a pressure to electricity transducer shaped as a strip with rectangular cross section, such as one employing a semiconductor element consisting of a semi-conducting crystalline body, for example silicon or germanium, having a piezoresistive effect, i.e., the ability convert a variation in pressure into a variation in electrical resistance.

In the embodiment shown in FIGS. 2*a* and 2*b* for use as a 45°° — 45° type stereophonic sound reproduction cartridge, the transducers **12*a* and 12*b* are arranged, in a projection from the major surfaces of the transucers, to form a substantially right angle with an inclination of substantially 45° to the surface of the sound recording disk. The coupler 11 of circular cross section is inscribed in the inner surfaces of the two transducers 12*a* and 12*b*. Accordingly, mechanical vibrations received by the stylus tip 8 in response to the shape of the sound groove in the disk can be transmitted to the two transducers 12*a* and 12*b*** with high fidelity.

Refering now to FIGS. 3*a* – 3*c*, the operation will be described.

Figure 3A:
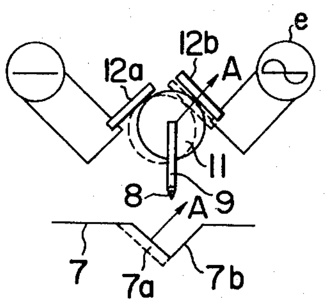

In FIG. 3*a*, when, the groove modulation of the disk 7 is set in a direction as shown by an arrow A, such that a groove wall **7*a* shown in dotted line is transferred in the 45° L channel direction as shown in solid line, the coupler 11 shown in dotted line is displaced in the arrow A direction as shown in solid line and the transducer 12*b* corresponding to the groove wall 7*a*** of the L channel, shown in dotted line, is bent in the arrow A direction as shown in solid line, thereby producing an output voltage *e*. In the figure, the symbols at the output terminals designate the phase relation of the waveforms. Alternatively, the transducer **12*a* corresponding to the groove wall 7*b* of the R channel receives no pressure since the coupler slides on the transducer 12*a*,** and thus no output voltage is produced.

Figure 3B:
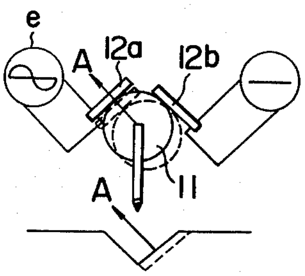
Figure 3C:
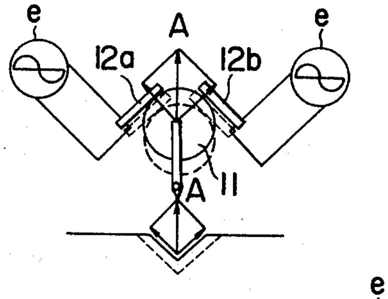

FIG. 3*b* shows the groove modulation in the 45° R channel direction. As in the case of FIG. 3*a* showing 45° L channel direction modulation, the coupler 11 gives rise to displacement of the transducer **12*a*** alone to produce the output voltage *e*, but slides on the other transducer **12*b*** without causing any output. In the vertical direction modulation of the arrow A, as will be shown in FIG. 3*c*, both transducers **12*a* and 12*b*** are displaced by the same amount of displacement in the same direction to produce output voltages *e* of the same amplitude in the same direction.

Figure 3D:
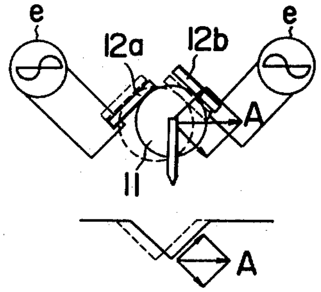

FIG. 3*d* shows the horizontal direction groove modulation. The coupler 11 is displaced in the horizontal direction to give rise to a right above displacement of the transducer **12*b* and a left below displacement of the transducer 12*a*,** thereby producing output voltages of the same amplitude but in the reverse directions in the respective transducers.

Figure 3E:
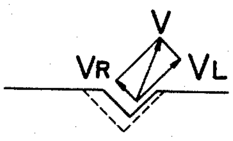

Real sound engraves the sound groove in random directions with random magnitude. Taking into consideration an instantaneous value, however, the sound may be represented by a vector V as shown in FIG. 3*e*. Since the vector V is decomposed to vectors $V_L$ and $V_R$ in the directions of the respective transducers, the sound is separately transmitted to the transducers **12*a* and 12*b*** and a stereophonic sound devoid of cross talk can be reproduced. It will be understood that the above operation is analogous to the movement of the stylus tip in the sound groove of the disk.

In FIGS. 3*a* – 3*d* for convenience of explanation, the right and left transducers **12*a* and 12*b*** are arranged symmetrically. However the polarity of either one of transducers is reversed for practical stereophonic reproduction by turning over one transducer or exchanging the connection of the lead wires so that the output signals of the transducers 12*a* and 12*b* have the same amplitude in phase under the horizontal groove modulation shown in FIG. 3*d*.

With a cartridge embodying the invention, the stylus tip is applied with a pressure to be urged against the disk and the pressure on the stylus biases the coupler 11 against the transducers 12*a* and 12*b*. Under these conditions, since signal pressures are applied on the transducers 12 in response to displacement of the sound groove, the stylus tip never fails to come into contact with the sound groove wall when the sound groove is displaced downwardly, thereby ensuring an accurate tracing.

For displacements of the groove in directions other than the vertical direction, extremely close disposition of the stylus tip 8 to the axial center of stylus arm 9 and rear end portion of the stylus arm 9 secured to the support structure, as shown in FIG. 2*b*, never cause the stylus tip 8 to rotate about the principal axis of the stylus arm 9 and ensure accurate separation, reduction in distortion and high efficiency transmission.

It is necessary for a high performance cartridge used for reproducing the aforementioned discrete four channel sound recording disk to have lower mechanical impedance of the stylus tip at high frequencies and higher resonance frequencies. It is especially important that it be able to respond to frequencies ranging from audio frequencies to ultrasonic frequencies. For this reason, reduction in the effective mass of the stylus tip calculated in terms of stylus tip position is of primary significance.

Such reduction requires minimization in mass and dimension of the stylus tip 8, stylus arm 9, transducers 12*a* and 12*b* and coupler 11 which constitute the vibrating element. In this respect, the coupler 11 of the embodiment can be miniaturized to the extreme and reduced in mass, as compared to the conventional V-shaped resolver 3 shown in FIGS. 1*a* and 1*b*. In addition, the stylus tip 8 made of 0.15 mm square naked diamond (0.03 mg mass) or bonded diamond (0.06 mg mass) having a titanium base of small specific gravity instead of an iron base and the stylus arm 9 is made from a titanium pipe having an outer diameter of 0.35 mm and 20 $\mu$ thickness or an ultra-hard aluminum alloy pipe having small diameter and thin thickness - made from up-to-date materials - contribute to reduce the effective mass at the stylus tip to the order of 0.5 mg to 1 mg. As described above, the embodiment permits high resonance frequencies exceeding the audio frequencies without causing reduction in frequencey response over 50 kHz and offers the required frequency characteristics for the cartridge to reproduce the discrete four channel sound recording disk which requires reproduction up to 45 kHz.

Further, a cartridge which has excellent characteristics such as small mechanical impedance and distortion can readily be obtained.

With reference to FIGS. 2*a* and 2*b*, disposition of the transducers 12*a* and 12*b* and the coupler 11 necessary for the optimum channel separation will be described.

For the optimum channel separation, the transducers 12*a* and 12*b* are needed to engage the coupler 11, in plane B, in effective perpendicular relation to the coupler. Generally, a cartridge necessarily has a space between the bottom surface of cartridge case 14 and the disk surface and the longitudinal axis of the stylus arm 9 is inclined at an angle $\alpha$. Since the major surfaces of the transducers 12*a* and 12*b* intersect at an angle $\beta$ not accurately equal to 90°, the coupler is disposed to be inscribed in the transducers at the angle $\beta$ effectively equal to 90° which is expressed, $$\beta = 180° - 2 \tan^{-1} (\cos \alpha).$$

Generally, since the angle $\alpha$ between the stylus arm 9 and the disk surface shown in FIG. 2*b* is considered nearly a vertical tracking angle, it is necessary to reduce the distortion by equalizing the vertical tracking angle to a vertical recording angle (approximately 15°) upon sound recording of the disk. In this respect, since the dimension of the coupler 11 of the embodiment is extremely small, it is easy to determine the angle $\alpha$ at the order of 15° to 20° and the vertical tracking error can be minimized to reduce the distortion.

Figure 4A:
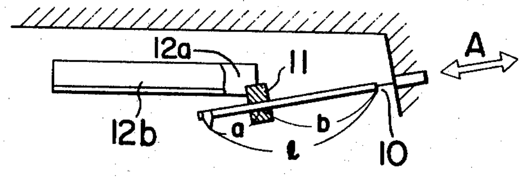

Further, by selectively positioning the coupler 11 with respect to the stylus arm 9, the stylus pressure of the cartridge and output sensitivity are optionally determined. For high output sensitivity and large stylus pressure, the coupler is disposed at the front portion of the stylus arm with its constant length $l$ divided at a ratio $a : b$ of larger value, as shown in FIG. 4*a*. While, for relatively lower output and small stylus pressure, the coupler is disposed at the rear portion of stylus arm with its length divided at a ratio $a : b$ of smaller value.

Figure 4B:
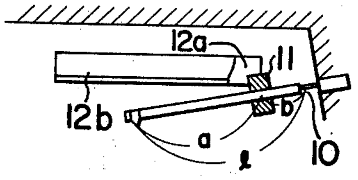

While, in FIGS. 4*a* and 4*b*, the position of the transducer 12*a* is varied, it is advisable to fix the transducer 12*a* and move the stylus arm support structure 10 and the coupler 11 relative to the transducer 12*a* in an arrow A direction. In this manner, it is possible to satisfy the requirements of the foregoing various purposes with a pick up cartridge having the same components.

Figure 4C:
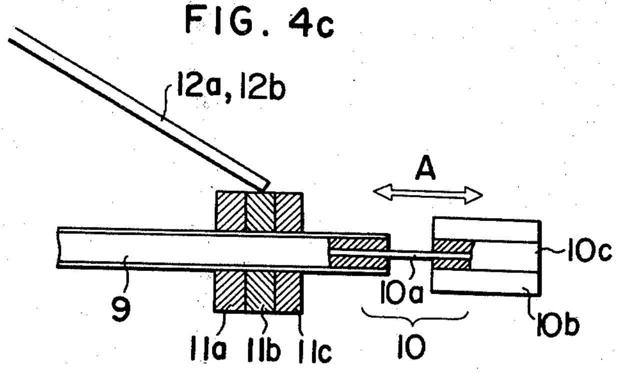

Referring not to FIG. 4*c*, there are provided the coupler 11 of viscous resilient material which consists of portions 11*a*, 11*b* and 11*c* having more than two different values of hardness and the stylus arm support structure 10 movable in an arrow A direction. The portion 11*a* has the largest hardness of all and the portions 11*b* and 11*c* have values of hardness which decrease in this order. Under this constitution, the transducer 12*a* engages the portion 11*a* to produce a maximized output voltage and endure a maximized stylus pressure. When the transducer engages the portion 11*c*, the output voltage is minimized but a small stylus pressure cartridge with a highly compliance is obtained with excellent frequency response. The stylus arm support structure 10, as illustrated in FIG. 4*c*, has a suspension wire 10*a* of phosphor bronze or nylon, one end of which is joined to the crylindrical stylus arm 9 within the rear end portion thereof and the other end of which is joined to a cylindrical supporter 10*b* within a through-hole 10*c*. The suspension wire 10*a* constitutes a notch and it acts as a fulcrum. The leverage $a : b$ of the stylus arm determining the position of the coupler 11 is related to the effective mass of the vibrating element calculated in terms of the stylus tip. Assuming now that the sum of the effective mass of transducers 12*a* and 12*b* at driven portions thereof and the mass of the coupler 11 is represented by $m$, the total effective mass $m_e$ calculated in terms of the stylus tip is expressed, $$m_e = m \left( \frac{b}{a+b} \right)^2 .$$

Figure 5A:
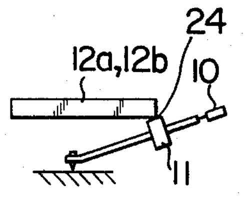
Figure 5B:
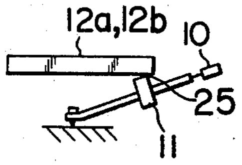
Figure 5C:
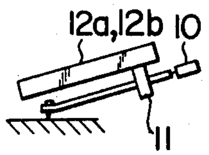

The smaller the value $b/(a+b)$ is, the smaller is $m_e$. Accordingly, the value $b/(a+b)$ is determined for a highly compliant cartridge capable of reproducing high frequencies. In FIGS. 5*a*, 5*b* and 5*c* showing modified embodiments of the invention, the coupler 11 in FIG. 5*a* engaging an edge portion 24 of the transducer 12, the coupler 11 FIG. 5*b* engaging a surface of the transducer 12 at an edge portion 25 of the coupler, and the coupler 11 in FIG. 5*c* engaging the transducer 12 in parallel relation, respectively.

Figure 6A:
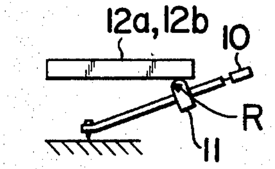
Figure 6B:
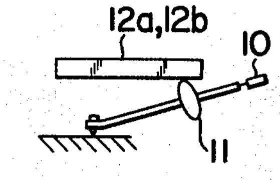

FIGS. 6*a* and 6*b* show further modified embodiments of the invention. An edge portion of the coupler 11 has a curvature of a certain value R, as shown in FIG. 6*a*. The coupler 11 of a double convex cross section or a cross section shaped as an ellipse, as shown in FIG. 6*b*, has a sharp portion engaging the transducer 12 and it ensures high compliance of the stylus tip and increases mechanical strength.

Figure 7A:
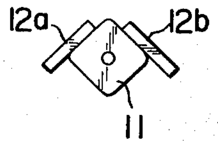
Figure 8A:
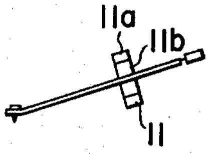
Figure 7B:
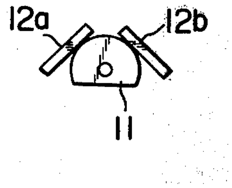
Figure 8B:
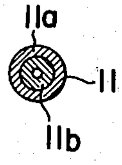
Figure 7C:
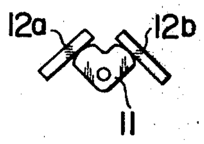
Figure 8C:
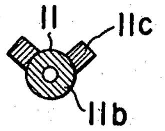

In FIGS. 7*a*, 7*b* and 7*c* modifications of coupler 11, are shown. FIG. 7*a* shows a coupler with a square section, FIG. 7*b* a coupler made by eliminating the lower portion mass of the coupler shown in FIGS. 2*a* and 2*b* and FIG. 7*c* a V-shaped coupler which is made by further elmininating unnecessary mass. eliminating FIG. 8 shows a further modification of the coupler. FIGS. S. 8*a* and 8*b* are a side view and a front view of the modification, respectively. Th coupler shown in FIG. 8 consists of an outer portion 11*a* made of viscous resilient material such as butyl rubber and an inner portion 11*b* made of a synthetic resin having a small specific gravity. The mass of resilient material is reduced, the divisional vibration and vibration transmission loss are decreased to improve the phase characteristics and transmission efficiency. As shown in FIG. 8*c*, unwanted portions of the couplers of FIGS. 8*a* and 8*b* are removed leaving segments 11*c* thereby minimizing the amount of viscous resilient material.

Figure 9:
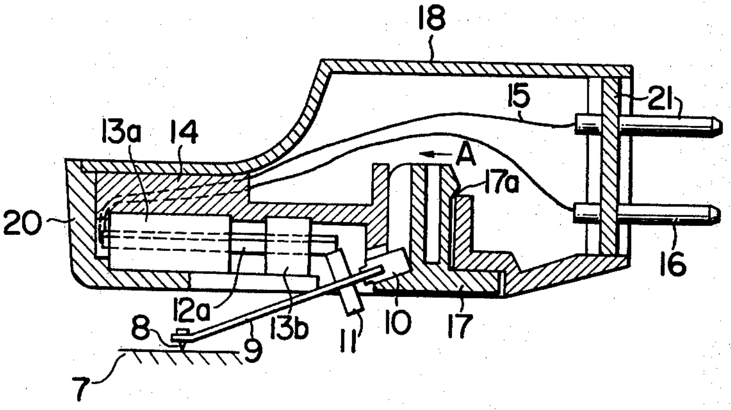
FIG. 9 is a cross-sectional view of a pickup cartridge embodying the invention.
Figure 10:
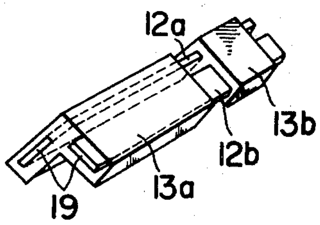
FIG. 10 is a perspective view of a damper of the pickup cartridge shown in FIG. 9.

Turning now to FIG. 9, a pickup cartridge embodying the invention will be explained. The supporter 10 of the stylus arm 9 is made of viscous resilient rubber such as butyl rubber and the stylus arm is pivoted at the supporter which in turn is secured to stylus holder 17. The stylus holder 17 is fixed to a casing 14 at a fixture pawl 17*a*. When the stylus holder 17 is drawn downwardly, the fixture pawl 17*a* is urged in an arrow A direction to be disengaged. The coupler 11 is mounted on the stylus arm 9 such that the coupler steadily engages one end of the transducer 12*a* when the stylus holder 17 is mounted. Dampers 13*a* and 13*b*, as shown in FIG. 10, are rectangular piezoelectric ceramics being shaped as a strip with rectangular cross section, or silicon semiconductors which are in the form of a V letter. The transducers 12*a* and 12*b* are inserted into rectangular openings 19 formed in the dampers 13*a* and 13*b* to be held therein. A damper clamper 20 is adapted to support the dampers 13*a* and 13*b*. The clamper 20 extends below the casing 14 and holds the dampers 13*a* and 13*b* between the clamper and the casing. A cover 18 is secured to the upper side of the casing 14 by adhesive. A terminal plate 21 is inserted downwardly into a slit provided at the rear portion of the casing 14 and then it is fixed. By way of the steps as has been described, the exemplified pickup cartridge can be very readily assembled. Numeral 15 designates lead wires, which are connected between the transducer 12 and terminals 16.

FIG. 11 shows modifications of the damper elements 13*b*. In FIG. 11*a*, the dampers 13*c* and 13*d* of circular cross-section made of viscous resilient material such as butyl rubber are held between the casing 14 and the right and left transducers 12*a* and 12*b*. The dampers disposed in this manner are advantageous in that they provide weak damping. If dampers of the usual rubber hardness are disposed as shown in FIG. 10, excessive damping is produced. If dampers of small rubber hardness are used, degradation of temperature characteristics may result. With the constitution of FIG. 11*a*, however, soft elasticity may be obtained with dampers of the usual rubber hardness without degrading the temperature characteristics. To enhance the above advantages, hollow cylindrical dampers 13*c* and 13*d* as shown in FIG. 11*b* are employed. FIG. 11*c* is a perspective view of FIG. 11*a*.

Figure 13B:
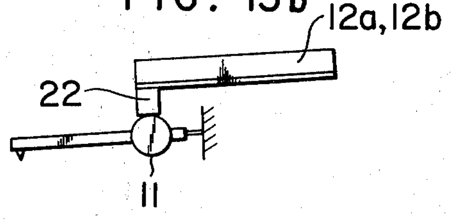
Figure 13C:
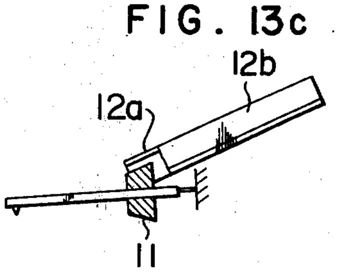
Figure 13D:
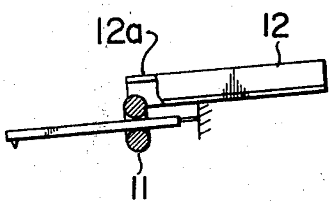

In a further embodiment of the invention shown in FIG. 12, the transducer 12 is disposed at the opposite side to the stylus tip 8. This disposition enables the stylus tip 8 to be observed directly and offers an easy-to-handle cartridge as compared with the foregoing embodiments. As seen from the figure, the coupler 11 is in the form of a conical frustum having an inclined surface with which the end of the transducer 12 comes in contact. The stylus arm 9 has at its rear end a flange 9*b* within which one end of a suspension wire 10*a* is joined. The other end of the suspension wire 10*a* inserted into a throughhole 10*c* in the support element 10*b* is separated by a spacer 10*d*. A stylus damper 10*f* interposed between the flange 9*b* and the supporter 10*b* is suitably compressed by pulling the suspension wire 10*a* in the arrow A direction so as to adjust the damping, and then the suspension wire 10*a* is fixed by means of a screw 10*e*. FIGS. 13*a* – 13*d* shows further embodiments, in which the transducer 12 is disposed at the opposite side to the stylus tip 8 as shown in FIG. 12. In FIGS. 13*a* and 13*a'*, a wing member 22 engages the end portion of the transducer 12 and the coupler 11 engages the end of the wing. A cartridge with this constitution enjoys a simple structure of the transducer 12 and the stylus element. FIGS. 13*b*, 13*c* and 13*d* show a ball shape coupler, a bevel gear shape coupler and an O-ring shape coupler, respectively.

A further embodiment of FIGS. 14*a* and 14*b* employs a damper member or cushion 23 of viscous resilient material corresponding to the wing 22 of FIG. 13*a*, which cushion engages the coupler with high damping efficiency.

With reference to FIG. 15, the frequency response of a conventional V type resolver pickup cartridge and the cartridge of the invention will be described. In the figure, symbols *a* and *a'*, *b* and *b'* and *c* and *c'* represent the frequency response of the conventional V type resolver ceramic cartridge, the conventional semiconductor type cartridge of silicon semiconductor, and the semiconductor type cartridge of semiconductor element of the invention, respectively. Output characteristics of the main channel correspond to curves *a*, *b* and *c*, and cross talk curves *a'*, *b'* and *c'*.

It should be understood from FIG. 15 that according to the invention, the frequency response covers high freqecies and the cross talk is decreased, thereby ensuring considerably improved frequency characteristics.

What we claim is:

1. A pickup cartridge for reproducing signals recorded on a 45° — 45° type stereophonic sound recording disk having two or more independent signals recorded in a single sound groove thereof, said pickup cartridge comprising a stylus assembly including a stylus arm having a longitudinal axis, a stylus tip attached to one end of said stylus arm, a stylus arm supporter made of viscous resilient material for pivotally supporting the other end of said stylus arm, a stylus-to-transducer coupler of viscous resilient material having a side surface and an edge secured to the mid-portion of said stylus arm on the longitudinal axis thereof, and a casing for holding said stylus arm supporter in place, a pair of pressure-to-electricity transducers each having a longitudinal axis, a major surface and an edge, the projections of said major surfaces intersecting at substantially a right angle and forming angles of substantially 45° with a surface of said sound recording disk, the intersection of the major surfaces of said transducers further defining a line in a plane through the longitudinal axis of said stylus arm, and a damper made of viscous resilient material secured to said casing and to said transducers, both of said transducers slidably engaging said stylus-to-transducer coupler to provide continuous slidable coupling of said transducers with said coupler, a mechanical vibration picked up by said stylus tip from the sound groove of said disk being converted by said transducers to an electrical signal.

2. A pickup cartridge according to claim 1, wherein the edges of said transducers engage the side surface of said coupler.

3. A pickup cartridge according to claim 1, wherein the edge of said coupler engages the side surfaces of said transducers.

4. A pickup cartridge according to claim 3, wherein said edge of said coupler is in the form of a curved surface.

5. A pickup cartridge according to claim 3, wherein the cross section of said coupler is in the form of an ellipse.

6. A pickup cartridge according to claim 1, wherein the side surface of said coupler engages the side surfaces of said transducers.

7. A pickup cartridge according to claim 1, wherein said coupler has a rectangular cross section perpendicular to the longitudinal axis of said stylus arm.

8. A pickup cartridge according to claim 1, wherein said coupler has a completely circular cross section perpendicular to the longitudinal axis of said stylus arm.

9. A pickup cartridge according to claim 1, wherein said coupler has a cross section in the form of an imcomplete circle perpendicular to the longitudinal axis of said stylus arm.

10. A pickup cartridge according to claim 1, wherein said coupler has a V-shaped cross section perpendicular to the longitudinal axis of said stylus arm.

11. A pickup cartridge according to claim 1, wherein said coupler is in the form of a conical frustum having a surface parallel to pressure receiving planes of said transducers.

12. A pickup cartridge according to claim 1, wherein said coupler is in the form of a torus having a curved surface contacting pressure receiving planes of said transducers.

13. A pickuo cartridge according to claim 1 wherein said stylus-to-transducer coupler is slidable on said stylus arm in the longitudinal direction thereof, the characteristics of said pickup cartridge being varied by moving said coupler to a desired position on said stylus arm.

14. A pickup cartridge according to claim 1 wherein a plurality of couplers are stacked on said stylus arm in the longitudinal direction thereof, each of said couplers being selectively engageable with said transducers to provide a plurality of coupling conditions.

15. A pickup cartridge according to claim 1 wherein said damper is provided with a pair of rectangular openings for receiving and securing said transducers with their major surfaces at said substantially right angle, the edges of said transducers at one end thereof detachably engaging the side surface of said coupler, said damper being located at the other ends of said transducers.

16. A pickup cartridge according to claim 15 wherein the longitudinal axes of said transducers are substantially parallel to the surface of said sound recording disk and said transducers extend toward said stylus tip, said damper being located adjacent said stylus tip.

17. A pickup cartridge according to claim 15 wherein the longitudinal axes of said transducers extend away from said stylus tip, the edges of said transducers engaging said coupler being between said stylus tip and said damper.

18. A pickup cartridge according to claim 17 which further comprises another damper of a viscous resilient material for holding said transducers, said another damper being disposed between said damper and the edges of said transducers engaging said coupler and having a cross section of the same shape as that of said damper.

19. A pickup cartridge according to claim 18 wherein said coupler and dampers are made of synthetic rubber.

20. A pickup cartridge according to claim 17 wherein said stylus arm supporter comprises a flange secured to the other end of said stylus arm, a support element, a suspension wire coupled to said flange and to said support element, and a stylus damper interposed between said flange and said supporter.

21. A pickup cartridge according to claim 17, wherein said coupler is in the form of a conical frustum.

22. A pickup cartridge according to claim 15, which further comprises another damper of a viscous resilient material, said another damper comprising two damper elements of circular cross section disposed in the gaps between said casing and portions of said transducers adjacent said damper.

23. A pickup cartridge according to claim 22, wherein said two damper elements are hollow cylinders.

24. A pickup cartridge according to claim 15, which further comprises another damper of a viscous resilient material for holding said transducers, said another damper being disposed between said damper and the edges of said transducers engaging said coupler.

25. A pickup cartridge according to claim 24, wherein said another damper has a cross section of the same shape as that of said damper.

26. A pickup cartridge according to claim 1 wherein said transducers include a wing member at the ends thereof slidably engaging said coupler, said engagement being on a plane parallel to an engaging plane of said wing member.

27. A pickup cartridge according to claim 26, wherein said coupler has a curved surface contacting the engaging plane of said wing.

28. A pickup cartridge according to claim 1 wherein said transducers include damper members at the ends thereof detachably engaging said coupler, said damper members being intermediate said coupler and said transducers for transmitting force from said coupler to said transducer.

29. A pickup cartridge according to claim 1 wherein said coupler and damper are made of synthetic rubber.

* * * * *